Sept. 16, 1930.  I. L. HARVEY  1,775,642
CREAM SEPARATOR
Filed June 21, 1929
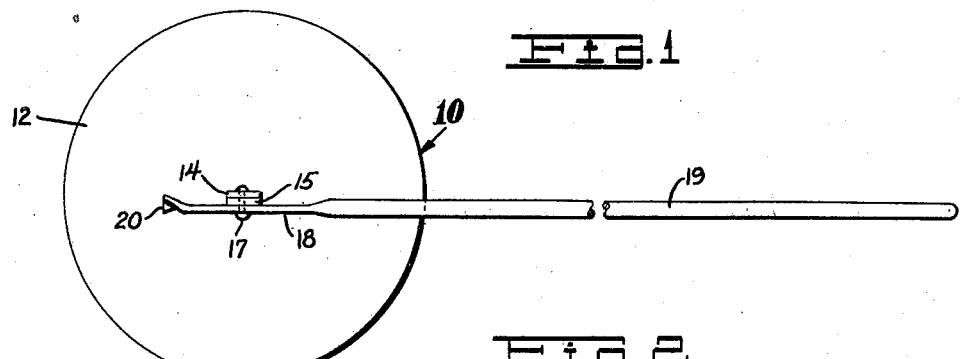
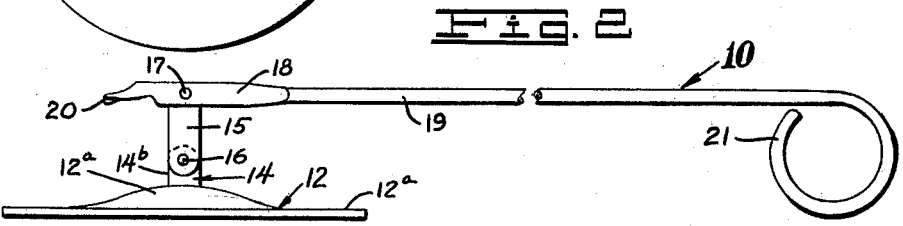
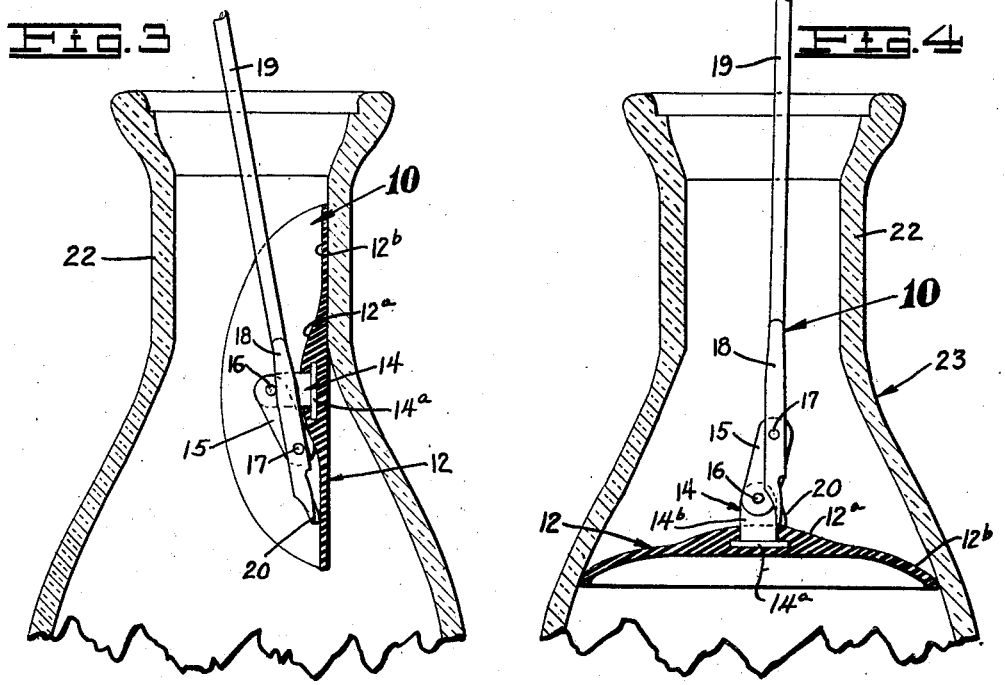
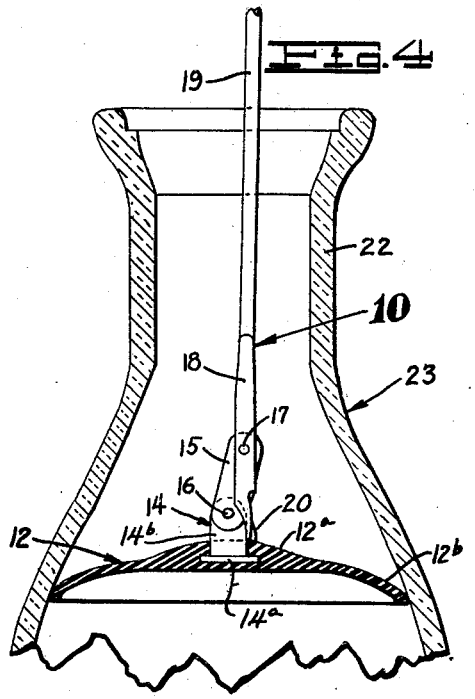
INVENTOR.
I. L. HARVEY.
BY
ATTORNEY.

Patented Sept. 16, 1930

1,775,642

UNITED STATES PATENT OFFICE

IVAN L. HARVEY, OF LOS ANGELES, CALIFORNIA, ASSIGNOR OF ONE-THIRD TO FRANCIS C. SWARTZ AND MARY G. SWARTZ AND ONE-THIRD TO NORA P. McCABE, ALL OF LOS ANGELES, CALIFORNIA

CREAM SEPARATOR

Application filed June 21, 1929. Serial No. 372,630.

This invention relates to improvements in cream separators.

The general object of the invention is to provide a sanitary and efficient cream separator for household use.

A specific object of the invention is to provide a disc cream separator having novel means for operating the same in separating the cream from the milk in a milk bottle.

A further object of the invention is to provide a novel connection for securing the handle on a disc cream separator.

Other objects and the advantages of this invention will be apparent from the following description taken in connection with the accompanying drawings wherein:

Fig. 1 is a top plan view of my improved device.

Fig. 2 is a side view of the device shown in Fig. 1.

Fig. 3 is a section through the top portion of a milk bottle showing my device being inserted therein and showing part of the device in section.

Fig. 4 is a view similar to Fig. 3 showing the device moved to a position wherein the body portion thereof forms a bulkhead between the cream and the milk.

Referring to the drawings by reference characters I have indicated my improved device generally at 10. As shown this device comprises a flexible body portion 12 which is preferably made of a good grade of rubber and includes an enlarged central portion 12$^a$ and a thinner more flexible outer portion 12$^b$. Embedded in the enlarged portion 12$^a$ I provide a connecting member 14 which includes a head 14$^a$ and a shank 14$^b$ which projects beyond the body portion.

One end of a link 15 is pivotally connected to the shank 14$^b$ at 16 and the opposite end of the link is pivotally connected as at 17 to a flattened portion 18 of an operating handle 19. The end of the operating handle 19 adjacent the link 15 is bent at right angles to form a stop 20 while the opposite end is bent to form a loop 21.

In Fig. 3 I have shown the device as being inserted into the neck 22 of a milk bottle 23. To insert the device 10 in the neck of a bottle the operating handle 19 is moved to a position wherein the stop 20 rests on the body portion 12 and then the body is turned up around the handle and inserted in the neck of the bottle in a vertical position and moved downward until it reaches a position below the cream level. The handle 19 is then moved upward which through the medium of the link 15 and the connecting member 14 swings the body portion 12 to a horizontal position as shown in Fig. 4. In this position the flexible outer portion 12$^b$ engages the shoulder of the bottle so that the body 12 forms an effective bulkhead between the cream and the milk whereupon the bottle may be tilted and the cream poured out independently of the milk.

When the operating handle 19 is moved so as to move the body portion to the position shown in Fig. 4 the stop 20 of the handle engages the shank 14$^b$ of the connecting member 14 and in conjunction with the offset relationship of the pivots 16 and 17 prevents the body portion from tilting as the cream is being poured out.

After the cream has been poured out the body portion 12 may be again moved to a vertical position by a slight downward movement of the handle 19 and then removed in the same manner as it was inserted, or it may be removed by merely pulling the handle 19 straight upward whereupon the resilient body 12 will flex as it is drawn out through the neck 22.

From the foregoing description it will be apparent that I have provided an improved cream separator which is simple in construction, sanitary and efficient in use.

Having thus described my invention, I claim:

1. In a cream separator, a body portion, a handle, a connecting member, said connecting member secured to said body, a link, one end of said link being pivotally connected to said handle and the opposite end of said link being pivotally connected to said connecting member and a stop portion on said handle adapted when said handle is in a position at right angles to said body to engage said connecting member.

2. In a cream separator, a resilient body portion, a handle, a connecting member, said connecting member being embedded in said body adjacent the center thereof and having a portion thereof projecting beyond said body, a link, one end of said link being pivotally connected to said handle and the opposite end of said link being pivotally connected to said connecting member, a stop portion on said handle adjacent said link, said stop being adapted when said handle is in a position at right angles to said body to engage said connecting member.

3. In a cream separator, a body portion, a handle, said body portion including an enlarged central portion having a relatively thin flexible portion therearound, a connecting member, said member including a head and a shank, said head being embedded in said enlarged portion of said body and said shank extending beyond said body, a link, one end of said link being pivotally connected to said shank and the opposite end of said link being pivotally connected to said handle, a stop portion at the end of said handle adjacent said link, said stop being adapted when said handle is in a position at right angles to said body to engage said shank of said connecting member.

4. In a cream separator, a resilient body portion, a handle, a connecting member, said connecting member being connected to said body adjacent the center thereof and having a portion thereof projecting beyond said body, a link, one end of said link being pivotally connected to said handle and the opposite end of said link being pivotally connected to said connecting member, said handle including a grasping portion and a portion adjacent said link and projecting beyond said link, said last mentioned portion being adapted to engage said body between the center and periphery thereof to aid in manipulating said body.

In testimony whereof, I hereunto affix my signature.

IVAN L. HARVEY.